(12) United States Patent
Bogolea et al.

(10) Patent No.: US 11,107,035 B2
(45) Date of Patent: Aug. 31, 2021

(54) METHOD FOR TRACKING AND MAINTAINING INVENTORY IN A STORE

(71) Applicant: Simbe Robotics, Inc., South San Francisco, CA (US)

(72) Inventors: Bradley Bogolea, San Francisco, CA (US); Durgesh Tiwari, San Francisco, CA (US); Jariullah Safi, San Francisco, CA (US); Shiva Reddy, San Francisco, CA (US); Lorin Vandegrift, San Francisco, CA (US)

(73) Assignee: Simbe Robotics, Inc., San Francisco, CA (US)

( * ) Notice: Subject to any disclaimer, the term of this patent is extended or adjusted under 35 U.S.C. 154(b) by 0 days.

(21) Appl. No.: 17/104,610

(22) Filed: Nov. 25, 2020

(65) Prior Publication Data

US 2021/0158278 A1    May 27, 2021

Related U.S. Application Data

(60) Provisional application No. 62/940,157, filed on Nov. 25, 2019.

(51) Int. Cl.
*G06K 9/00* (2006.01)
*G06Q 10/08* (2012.01)
(Continued)

(52) U.S. Cl.
CPC ....... *G06Q 10/087* (2013.01); *G06K 9/00691* (2013.01); *G06K 9/00718* (2013.01);
(Continued)

(58) Field of Classification Search
CPC .. G06Q 10/087; G06Q 30/0639; G06Q 50/28; G06Q 10/06311; G06Q 10/0875; G06Q 10/063112; G06Q 10/06316; G06Q 20/203; G06Q 30/0629; G06Q 30/0643; G06Q 30/0633; G06Q 20/12;
(Continued)

(56) References Cited

U.S. PATENT DOCUMENTS 8,577,136 B1 * 11/2013 Ascher ................ G06Q 10/087
                                                                 382/165
2014/0001265 A1 * 1/2014 Gopalakrishnan ... G06K 7/1443
                                                                 235/462.08
(Continued)

*Primary Examiner* — Alex Kok S Liew
(74) *Attorney, Agent, or Firm* — Run8 Patent Group, LLC; Peter Miller

(57) ABSTRACT

One variation of a method for tracking and maintaining inventory in a store includes: accessing a image of an inventory structure in the store; identifying a top shelf, in the inventory structure, depicted in the image; identifying a set of product units occupying the top shelf based on features detected in the image; identifying a second shelf, in the set of shelves in the inventory structure, depicted in the image, the second shelf arranged below the top shelf in the inventory structure; based on features detected in the image, detecting an understock condition at a slot—assigned to a product type—on the second shelf; and, in response to the set of product units comprising a product unit of the product type, generating a prompt to transfer the product unit of the product type from the top shelf into the slot on the second shelf at the inventory structure.

20 Claims, 5 Drawing Sheets

(51) Int. Cl.
*G06T 7/00* (2017.01)
*G06T 7/11* (2017.01)

(52) U.S. Cl.
CPC .............. *G06T 7/0008* (2013.01); *G06T 7/11* (2017.01); *G06T 2207/30108* (2013.01); *G06T 2207/30242* (2013.01)

(58) Field of Classification Search
CPC ......... G06Q 10/06315; G06Q 30/0601; G06Q 10/02; G06Q 10/0631; G06Q 10/083; G06Q 10/1095; G06Q 10/30; G06Q 30/016; G06Q 30/0281; G06Q 30/0605; G06Q 30/0613; G06Q 30/0617; G06Q 30/0619; G06Q 30/0631; G06K 9/00771; G06K 9/00671; G06K 9/00624; G06K 9/22; G06K 2209/17; G06K 2209/01; G06K 9/00201; G06K 9/00362; G06K 9/325; G06K 9/6231; G06K 7/10297; G06K 9/78; G06K 2009/00738; G06K 7/10821; G06K 7/1413; G06F 16/90335; G06F 16/583; G06F 16/23; G06F 16/235; G06F 16/288
See application file for complete search history.

(56) References Cited

U.S. PATENT DOCUMENTS

2017/0193434 A1* 7/2017 Shah .................. G06K 9/00664
2018/0260767 A1* 9/2018 Findlay ................ G06Q 10/087

\* cited by examiner

METHOD FOR TRACKING AND MAINTAINING INVENTORY IN A STORE

CROSS-REFERENCE TO RELATED APPLICATIONS

This application claims the benefit of U.S. Provisional Application No. 62/940,157, filed on 25 Nov. 2019, which is incorporated in its entirety by this reference.

This application is related to U.S. patent application Ser. No. 15/347,689, filed on 9 Nov. 2016, and to U.S. patent application Ser. No. 15/600,527, filed on 19 May 2017, each of which is incorporated in its entirety by this reference.

TECHNICAL FIELD

This invention relates generally to the field of stock keeping and more specifically to a new and useful method for tracking and maintaining inventory in a store in the field of stock keeping.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
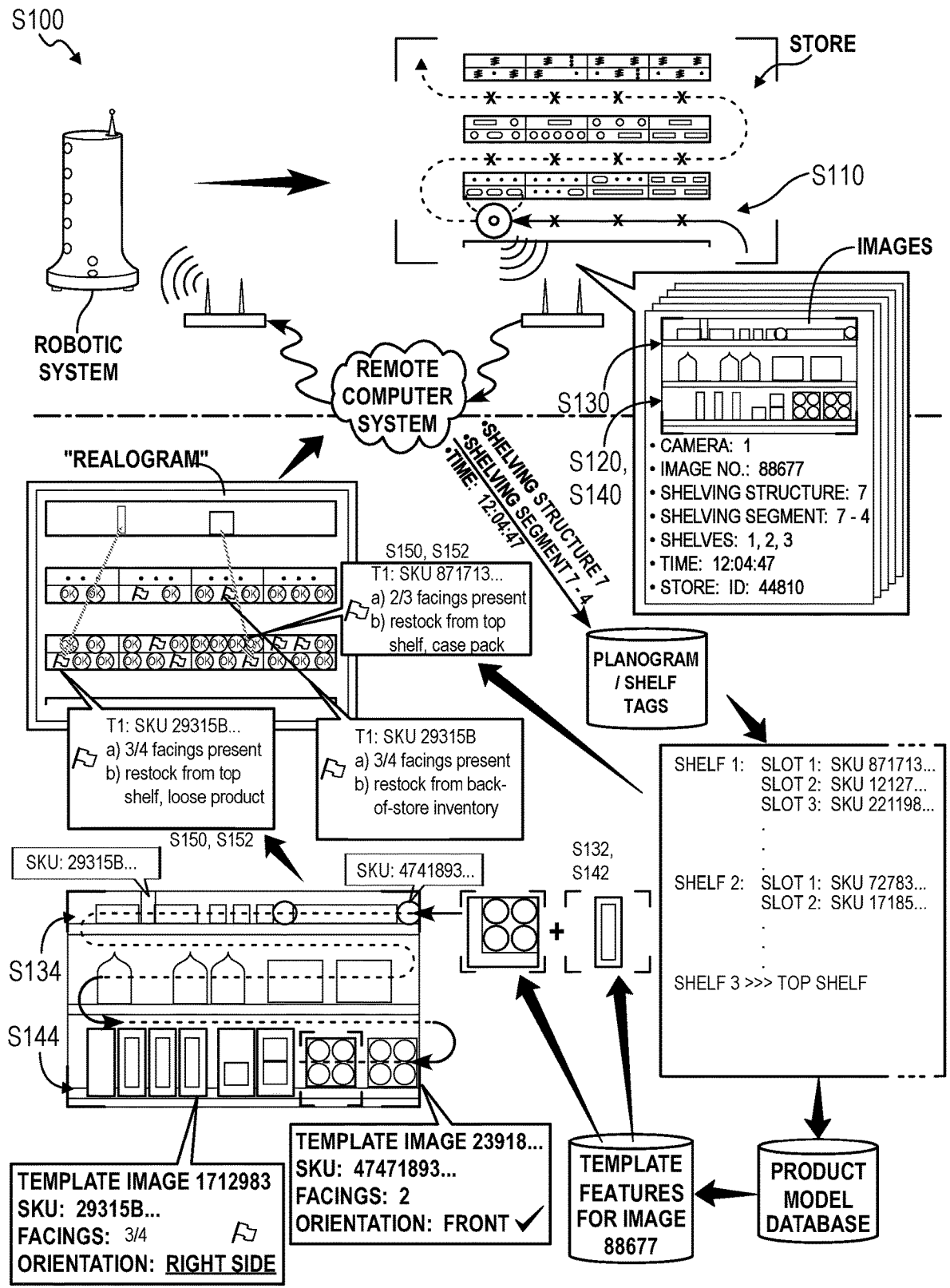
FIG. 1 is a flowchart representation of a method.

As shown in FIG. 1, a method S100 for tracking and maintaining inventory in a store includes: accessing a first image of a first inventory structure in the store in Block S110; identifying a top shelf, in the first inventory structure, depicted in the first image in Block S130; identifying a first set of product units occupying the top shelf of the first inventory structure based on features detected in the first image in Block S134; identifying a second shelf, in the first set of shelves in the first inventory structure, depicted in the first image in Block S140, the second shelf arranged below the top shelf in the first inventory structure; based on features detected in the first image, detecting an understock condition at a first slot on the second shelf in Block S144, the first slot assigned to a first product type; and, in response to the first set of product units comprising a product unit of the first product type, generating a first prompt to transfer the product unit of the first product type from the top shelf into the first slot on the second shelf at the first inventory structure in Block S152.

Figure 3:
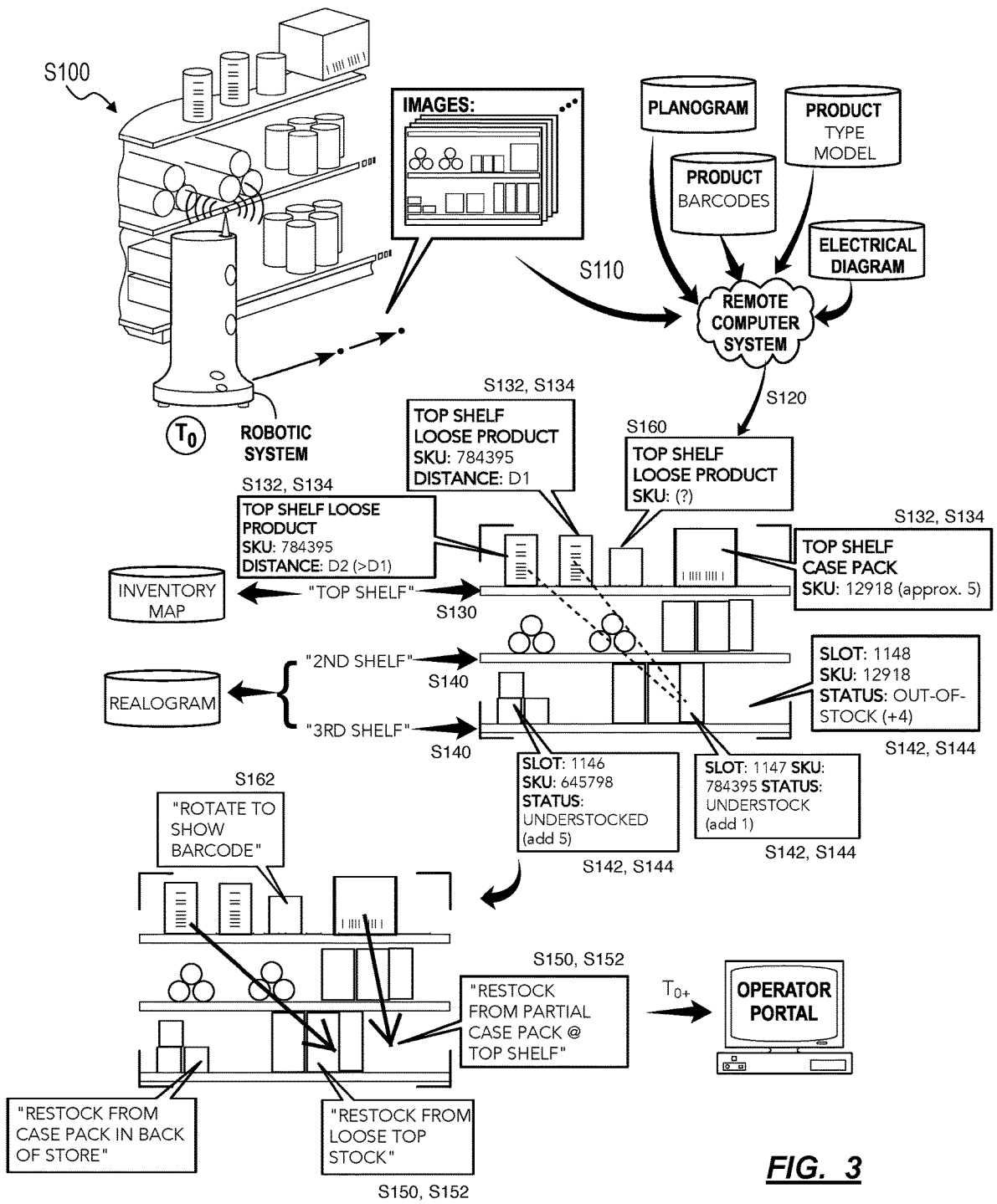
FIG. 3 is a flowchart representation of one variation of the method.

As shown in FIGS. 1 and 3, one variation of the method includes: accessing a first image of a first inventory structure in the store in Block S110; detecting a first set of shelves, in the first inventory structure, depicted in the first image in Block S120; identifying a top shelf, in the first set of shelves in the first inventory structure, depicted in the first image in Block S130; extracting a first set of features from a first region of the first image adjacent the top shelf in Block S132; and identifying a first set of product units occupying the top shelf of the first inventory structure based on the first set of features in Block S134. The method also includes: identifying a second shelf, in the first set of shelves in the first inventory structure, depicted in the first image in Block S140, the second shelf arranged below the top shelf in the first inventory structure; extracting a second set of features from a second region of the first image adjacent the second shelf in Block S142; based on the second set of features, detecting an understock condition at a first slot on the second shelf in Block S144, the first slot assigned to a first product type; and, in response to the first set of product units comprising a product unit of the first product type, generating a first prompt to transfer the product unit of the first product type from the top shelf into the first slot on the second shelf at the first inventory structure in Block S152.

As shown in FIGS. 1 and 3, another variation of the method includes: accessing a first image of a first inventory structure in the store in Block S110; detecting a first set of shelves, in the first inventory structure, depicted in the first image in Block S120; identifying an inventory shelf, in the first set of shelves in the first inventory structure, depicted in the first image in Block S130; extracting a first set of features from a first region of the first image adjacent the inventory shelf in Block S132; identifying a first set of product units occupying the inventory shelf of the first inventory structure based on the first set of features in Block S134; identifying a customer-facing shelf, in the first set of shelves in the first inventory structure, depicted in the first image in Block S140; extracting a second set of features from a second region of the first image adjacent the customer-facing shelf in Block S142; based on the second set of features, detecting an understock condition at a first slot on the customer-facing shelf in Block S144; identifying a first product type assigned to the first slot in Block S150; and, in response to the first set of product units comprising a product unit of the first product type, generating a first prompt to transfer the product unit of the first product type from the inventory shelf into the first slot on the customer-facing shelf at the first inventory structure in Block S152.

2. Applications

Generally, Blocks of the method S100 can be executed by a computer system: to dispatch a robotic system to capture images of products arranged on shelves throughout a retail space (e.g., a grocery store); to interpret stock conditions of slots on shelves in inventory structures throughout the store based on images captured by the robotic system; to detect product units inventoried on top shelves of these inventory structures based on these images captured by the robotic system; and to automatically prompt associates of the store to selectively reload understocked slots with product units inventoried on top shelves of the same inventory structures or to reload these understocked slots with back-of-store inventory based on whether product units of products assigned to these understocked slots are present on these top shelves. In particular, the computer system can integrate stock-keeping and restocking prompts into top-shelf inventorying processes at a store by: monitoring both stock conditions of slots in lower, customer-facing slots in an inventory structure and presence of loose product units inventoried on an unstructured top shelf of the inventory structure; and then prompting restocking actions for understocked slots in this inventory structure based on whether product units of products assigned to these understocked slots are present on the top shelf.

The computer system can thus serve contextual restocking guidance to store associates based on top-shelf inventory throughout the store, thereby: enabling these store associates to quickly restock an understocked customer-facing slot with top-shelf inventory when available; and enabling these store associates to retrieve back-of-store inventory only when top-shelf inventory is insufficient to restock the customer-facing slot; and therefore improving restocking and slot maintenance in the store.

Furthermore, the robotic system is described herein as capturing photographic images and/or depth images, and the robotic system is described herein as processing these photographic images and/or depth images to derived conditions of slots on inventory structures in a store. However, the robotic system can capture and the computer system can process optical data of any other type according to the method S100, such as multi-spectral images or signatures, infrared images, 2D or 3D images, depth maps, stereo images, and/or point clouds, etc.

Additionally, the method S100 is described herein as executed by the computer system remotely from the robotic system. However, the robotic system can execute some or all Blocks of the method S100 locally and then distribute prompts directly to associates in the store or return these prompts or store inventory statuses to the (remote) computer system for selectively distribution to store associates.

3. Robotic System

Figure 2:
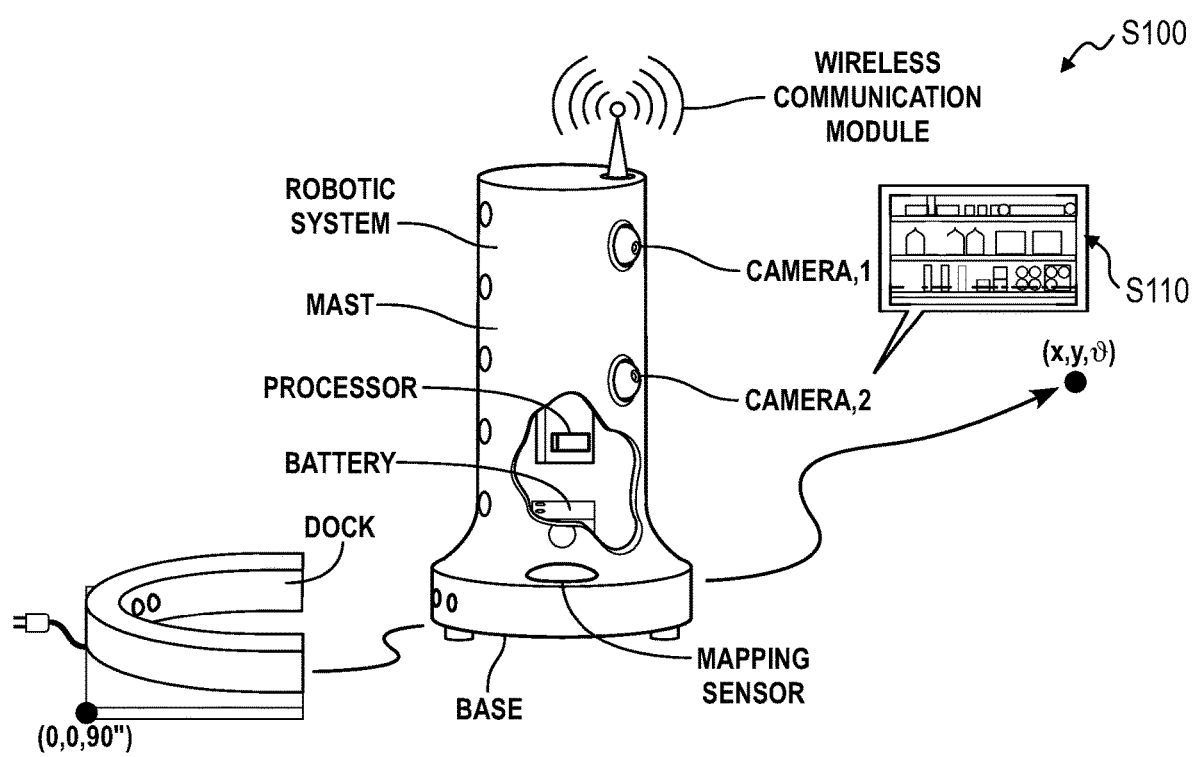
FIG. 2 is a schematic representation of a robotic system.

As shown in FIG. 2, a robotic system autonomously navigates throughout a store and records images—such as photographic images of packaged goods and/or depth images of inventory structures—continuously or at discrete predefined waypoints throughout the store during a scan cycle. Generally, the robotic system can define a network-enabled mobile robot configured to autonomously: traverse a store; capture photographic (e.g., color, black-and-white) and/or depth images of shelving structures, shelving segments, shelves, slots, or other inventory structures within the store; and upload those images to the computer system for analysis, as described below.

In one implementation shown in FIG. 2, the robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems configured to generate depth images); a processor that transforms data collected by the mapping sensors into two- or three-dimensional maps of a space around the robotic system; a mast extending vertically from the base; a set of photographic cameras arranged on the mast; and a wireless communication module that downloads waypoints and a master map of a store from a computer system (e.g., a remote server) and that uploads photographic images captured by the photographic camera and maps generated by the processor to the computer system, as shown in FIG. 2. In this implementation, the robotic system can include photographic cameras mounted statically to the mast, such as a first vertical array of (e.g., two, six) photographic cameras on a left side of the mast and a second vertical array of photographic cameras on the right side of the mast, as shown in FIG. 2. The robotic system can additionally or alternatively include articulable photographic cameras, such as: one photographic camera on the left side of the mast and supported by a first vertical scanning actuator; and one photographic camera on the right side of the mast and supported by a second vertical scanning actuator. The robotic system can also include a zoom lens, a wide-angle lens, or any other type of lens on each photographic camera. However, the robotic system can define any other form and can include any other subsystems or elements supporting autonomous navigating and image capture throughout a store environment.

Furthermore, multiple robotic systems can be deployed in a single store and can be configured to cooperate to image shelves and product units within the store. For example, two robotic systems can be deployed to a large single-floor retail store and can cooperate to collect images of all shelves and inventory structures in the store within a threshold period of time (e.g., within one hour). In another example, one robotic system is deployed on each floor of a multi-floor store, and each robotic system collects images of shelves and inventory structures on its corresponding floor. The computer system can then aggregate photographic and/or depth images captured by these robotic systems deployed in this store to generate a graph, map, table, and/or task list for managing distribution and restocking of product throughout the store.

Generally, the method is described herein as executed by a computer system: to detect loose product units and/or case packs stored in inventory on top shelves of customer-facing inventory structures within a store based on images captured by a mobile robotic system while autonomously navigating throughout a customer section of the store; to detect stock conditions in customer-facing slots on shelves—below the top shelves—of these customer-facing inventory structures based on these images captured by the mobile robotic system; and to generate prompts to restock customer-facing slots on these lower shelves with loose product units and/or product units from case packs stored on these top shelves. However, the method can additionally or alternatively execute Blocks of the method: to detect stock conditions on top shelves and customer-facing slots in the customer section of the store based on images captured by fixed cameras located throughout the store; to detect loose product units and/or case packs stored in back-of-store inventory structures within the store based on images captured by the mobile robotic system while autonomously navigating throughout the back-of-store section of the store and/or based on fixed cameras located in the back-of-store section of the store; and to detect loose product units and/or case packs stored in inventory on other (e.g., lower) inventory shelves within the store based on such images; etc.

4. Hierarchy and Terms

A "product facing" is referred to herein as a side of a product (e.g., of a particular SKU or other product identifier) designated for a slot. A "planogram" is referred to herein as a plan or layout for display of multiple product facings across many shelving structures, inventory structures, and other inventory structures within a store (e.g., across an entire store). In particular, the planogram can specify target product identification, target product placement, target product quantity, target product quality (e.g., ripeness, time to peak ripeness, maximum bruising), and product orientation data for product facings and groups of loose product units for fully-stocked shelving structures, inventory structures, and other inventory structures within the store. For example, the planogram can define a graphical representation of product units assigned to slots in one or more inventory structures within the store. Alternatively, the planogram can record textual product placement for one or more inventory structures in the store in the form of a spreadsheet, slot index, or other database (hereinafter a "product placement database").

A "slot" is referred to herein as a section (or a "bin") of a customer-facing shelf on an "inventory structure" designated for storing and displaying product units of the product type (i.e., of the same SKU or CPU). An inventory structure can include an open, closed, humidity-controller, temperature-controlled, and/or other type of inventory structure containing one or more slots on one or more shelves. A "top shelf" is referred to herein as a shelf designated for local product inventory at an inventory structure, such a located above and/or offset inwardly from customer-facing shelves below.

A "store" is referred to herein as a (static or mobile) facility containing one or more inventory structures.

A "product" is referred to herein as a type of loose or packaged good associated with a particular product identifier (e.g., a SKU) and representing a particular class, type, and varietal. A "unit" or "product unit" is referred to herein as an instance of a product—such as one bottle of detergent, one box of cereal, or package of bottle water—associated with one SKU value.

Furthermore, a "realogram" is referred to herein as a representation of the actual products, actual product placement, actual product quantity, and actual product orientation of products and product units throughout the store during a scan cycle, such as derived by the computer system according to Blocks of the method S100 based on images and/or other data recorded by the robotic system while autonomously executing scan cycles in the store.

The method S100 is described herein as executed by a computer system (e.g., a remote server, a computer network). However, Blocks of the method S100 can be executed by one or more robotic systems deployed in a retail space (or store, warehouse, etc.), by a local computer system (e.g., a local server), or by any other computer system—hereinafter a "system."

Furthermore, Blocks of the method S100 are described below as executed by the computer system to identify products stocked on open shelves on shelving structures within a store. However, the computer system can implement similar methods and techniques to identify products stocked in cubbies, in a refrigeration unit, on a wall rack, in a freestanding floor rack, on a table, in a hot-food display, or on or in any other product organizer or display in a retail space.

5. Robotic System Deployment and Scan Cycle

Block S110 of the method S100 recites dispatching a robotic system to autonomously navigate throughout a store and to record photographic image and/or depth images of inventory structures within the store during a scan cycle. Generally, in Block S110, the computer system can dispatch the robotic system to autonomously navigate along a pre-planned sequence of waypoints or along a dynamic path and to record photographic and/or depth images of inventory structures throughout the store, as shown in FIG. 1.

5.1 Scan Cycle: Waypoints

In one implementation, the computer system: defines a set of waypoints specifying target locations within the store through which the robotic system navigates and captures images of inventory structures throughout the store during a scan cycle; and intermittently (e.g., twice per day) dispatches the robotic system to navigate through this sequence of waypoints and to record images of inventory structures nearby during a scan cycle. For example, the robotic system can be installed within a store, and the computer system can dispatch the robotic system to execute a scan cycle during store hours, including navigating to each waypoint throughout the store and collecting data representative of the stock state of the store in near real-time as patrons move, remove, and occasionally return product on, from, and to inventory structures within the store (e.g., shelving structures, refrigeration units, inventory structures, hanging racks, cubbies, etc.). During this scan cycle, the robotic system can: record photographic (e.g., color, black-and-white) images of each inventory structure; record depth images of all or select inventory structures; and upload these photographic and depth images to the computer system, such as in real-time or upon conclusion of the scan cycle. The computer system can then: detect types and quantities of packaged goods stocked in slots on these inventory structures in the store based on data extracted from these photographic and depth images; and aggregate these data into a realogram of the store.

The computer system can therefore maintain, update, and distribute a set of waypoints to the robotic system, wherein each waypoint defines a location within a store at which the robotic system is to capture one or more images from the integrated photographic and depth cameras. In one implementation, the computer system defines an origin of a two-dimensional Cartesian coordinate system for the store at a charging station—for the robotic system—placed in the store, and a waypoint for the store defines a location within the coordinate system, such as a lateral ("x") distance and a longitudinal ("y") distance from the origin. Thus, when executing a waypoint, the robotic system can navigate to (e.g., within three inches of) a (x,y) coordinate of the store as defined in the waypoint. For example, for a store that includes shelving structures with four-foot-wide shelving segments and six-foot-wide aisles, the computer system can define one waypoint laterally and longitudinally centered—in a corresponding aisle—between each opposite shelving segment pair. A waypoint can also define a target orientation, such as in the form of a target angle ("∂") relative to the origin of the store, based on an angular position of an aisle or shelving structure in the coordinate system. When executing a waypoint, the robotic system can orient to (e.g., within 1.5° of) the target orientation defined in the waypoint in order to align the suite of photographic and depth cameras to an adjacent shelving structure or inventory structure.

When navigating to a next waypoint, the robotic system can scan its environment with the same or other depth sensor (e.g., a LIDAR sensor, as described above), compile depth scans into a new map of the robotic system's environment, determine its location within the store by comparing the new map to a master map of the store defining the coordinate system of the store, and navigate to a position and orientation within the store at which the output of the depth sensor aligns—within a threshold distance and angle—with a region of the master map corresponding to the (x,y,∂) location and target orientation defined in this next waypoint.

In this implementation, before initiating a new scan cycle, the robotic system can download—from the computer system—a set of waypoints, a preferred order for the waypoints, and a master map of the store defining the coordinate system of the store. Once the robotic system leaves its dock at the beginning of a scan cycle, the robotic system can repeatedly sample its integrated depth sensors (e.g., a LIDAR sensor) and construct a new map of its environment based on data collected by the depth sensors. By comparing the new map to the master map, the robotic system can track its location within the store throughout the scan cycle. Furthermore, before navigating to a next scheduled waypoint, the robotic system can confirm completion of the current waypoint based on alignment between a region of the master map corresponding to the (x,y,∂) location and target orientation defined in the current waypoint and a current output of the depth sensors, as described above.

However, the robotic system can implement any other methods or techniques to navigate to a position and orientation in the store that falls within a threshold distance and angular offset from a location and target orientation defined by a waypoint.

5.2 Scan Cycle: Dynamic Path

In another implementation, during a scan cycle, the robotic system can autonomously generate a path throughout the store and execute this path in real-time based on: obstacles (e.g., patrons, spills, inventory structures) detected nearby; priority or weights previously assigned to inventory structures or particular slots within the store; and/or product sale data from a point-of-sale system connected to the store and known locations of products in the store, such as defined in a planogram; etc. For example, the computer system can dynamically generate its path throughout the store during a scan cycle to maximize a value of inventory structures or particular products imaged by the robotic system per unit time responsive to dynamic obstacles within the store (e.g., patrons, spills), such as described in U.S. patent application Ser. No. 15/347,689.

In this implementation, the robotic system can then continuously capture photographic images and/or depth images of inventory structures in the store (e.g., at a rate of 10 Hz, 24 Hz). However, in this implementation, the robotic system can capture images of inventory structures within the store at any other frequency during this scan cycle.

5.3 Scan Cycle Scheduling

In one implementation, the robotic system can continuously navigate and capture scan data of inventory structures within the store; when a state of charge of a battery in the robotic system drops below a threshold state, the robotic system can return to a charging station to recharge before resuming autonomous navigation and data capture throughout the store.

Alternatively, the computer system can schedule the robotic system to execute intermittent scan cycles in the store, such as: twice per day during peak store hours (e.g., 11 AM and 6 PM on weekdays) in order to enable rapid detection of stock condition changes as patrons remove, return, and/or move products throughout the store; and/or every night during close or slow hours (e.g., 1 AM) to enable detection of stock conditions and systematic restocking of understocked slots in the store before the store opens the following morning or before a next peak period in the store.

However, the computer system can dispatch the robotic system to execute scan cycles according to any other fixed or dynamic schedule.

6. Image Access

Block S110 of the method S100 recites accessing an image of an inventory structure. Generally, the robotic system can return photographic and/or depth images recorded during a scan cycle to a remote database, such as in real-time during the scan cycle, upon completion of the scan cycle, or during scheduled upload periods. The computer system can then access these photographic and/or depth images from this database in Block S110, as shown in FIG. 1, before processing these images according to Blocks of the method S100 described below.

In one implementation, the computer system processes individual photographic images according to the method S100 in order to identify product units depicted in these individual images. Alternatively, the computer system can: stitch multiple photographic images into one composite image representing a greater length of one inventory structure (or greater length of multiple adjacent inventory structures); and then process these "composite" images according to methods and techniques described below.

For example, the computer system can deploy the robotic system to execute a scan cycle in the store. During this scan cycle, the robotic system can: autonomously navigate along a set of inventory structures in the store; capture a sequence of photographic images of the set of inventory structures; and return these photographic images to the computer system, such as in real-time or upon conclusion of the scan cycle. The computer system can then: access a first series of photographic images—in the sequence of photographic images—of an inventory structure captured by the mobile robotic system during the scan cycle; compile this first series of photographic images into a first image of the inventory structure; process this first image as described below; and repeat this process for each other series of photographic images depicting each other inventory structure in the store.

7. Image Segmentation and Shelf Detection

Block S120 of the method S100 recites detecting a set of shelves, in the inventory structure, depicted in the image. Generally, in Block S120, the computer system can extract features from the image and detect discrete shelves in the image based on these features.

In one implementation, the computer system: detects a set of features in the image; extracts—from this set of features—a first linear feature extending laterally across (substantially a full width of) the image; extracts—from this set of features—a second linear feature extending laterally across (substantially the full width of) the image and offset below the first linear feature by a distance approximating a common shelf thickness or a known shelf thickness of inventory structures throughout the store; and correlates the first linear feature and the second linear feature with a first shelf in the inventory structure. In this implementation, the computer system can similarly: extract—from this set of features—a third linear feature extending laterally across the image and offset above the first linear feature; extract—from this set of features—a fourth linear feature extending laterally across the image and offset below the third linear feature by a distance approximating the common or known shelf thickness; and correlate the third linear feature and the fourth linear feature with a second shelf in the inventory structure above the first shelf in the inventory structure.

In the foregoing example, the computer system can then define a first region of the image extending from proximal the first linear feature to proximal the fourth linear feature above and extending across the full width of the image cropped to the width of the inventory structure. The computer system can thus extract a first region of the first image—cropped or otherwise bounded around the inventory structure—corresponding to an accessible volume above the first shelf in the inventory structure. The computer system can repeat this process for each other shelf in the inventory to generate or define a set of image regions, each representing an area or volume above one shelf in the inventory structure.

However, the computer system can implement any other method or technique to segment an image of an inventory structure around a shelf represented in the image.

8. Top Shelf Detection

Block S130 of the method S100 recites identifying a top shelf, in the set of shelves in the inventory structure, depicted in the image.

In one implementation shown in FIG. 1, the computer system queries the planogram of the store (or of the inventory structure specifically) to confirm that this inventory structure is designated for top-shelf inventory; if so, the computer system selects a particular shelf—from the set of shelves detected in the image—depicted nearest the top edge of the image. The computer system can additionally or alternatively: merge a concurrent depth image of the inventory structure with the image to estimate a height of the uppermost shelf detected in the image; confirm whether the height of the upper shelf falls within a range (e.g., 1.8-2.5 meters above the floor) associated with top shelves—designed for inventory over customer-facing shelves in inventory structures—in the store; and label this uppermost shelf as the top shelf of the inventory structure accordingly.

In another implementation, if the store is outfitted with inventory structures that include top shelves that are shallower than customer-facing shelves below, the computer system can: project boundaries around shelves detected in the image onto the depth image (e.g., based on a known offset between the color camera and the depth camera); confirm that the leading face of the uppermost shelf is inset from the leading faces of lower shelves in the inventory structure; and label this uppermost shelf as the top shelf of the inventory structure accordingly.

Additionally or alternatively, the computer system can distinguish the top shelf in an inventory structure from lower shelves based on absence of price tags along the top shelf and presence of price tags along these lower shelves.

However, the computer system can implement any other method or technique to identify a top shelf—designated for local product inventory at the inventory structure—depicted in the image in Block S130.

9. Top Shelf Region of Interest

The computer system can then isolate a region of interest of the image depicting product units occupying the top shelf of the inventory structure. In one implementation shown in FIGS. 4A and 4B, after detecting the top shelf in the image, the computer system can: implement object detection to detect objects located above the top shelf depicted in the image; and calculate a boundary around these objects to define a region of interest in the image. In another implementation, the computer system can: detect a leading face of the top shelf in the concurrent depth image; scan the depth image for a set of surfaces (e.g., product units, boxes, case packs) above the leading face of the top shelf and within a range of distances from the leading face (e.g., surfaces up to ten centimeters in from of the leading face and up to 30 centimeters behind the leading face of the top shelf); and project boundaries of these surfaces detected in the depth image onto the image (e.g., based on a known offset between the color camera and the depth camera) to define a region of interest in the image.

In another implementation, the computer system queries the planogram for a maximum height of products assigned to slots on this inventory structure and then defines a rectilinear region of interest—in the image—that: spans the full width of the top shelf detected in the image; and spans a height equal to the maximum height of products assigned to slots on lower shelves in this inventory structure. In a similar implementation, the computer system: extracts a maximum height (e.g., in pixels, in millimeters) between vertically-adjacent customer-facing shelves depicted in the image (e.g., a distance between two adjacent shelves below the top shelf, a distance between the top shelf and a second shelf immediately therebelow); and then defines a rectilinear region of interest—over the image—that spans the full width of the top shelf detected in the image and spans a height equal to the maximum height between vertically-adjacent shelves depicted in the image.

However, the computer system can implement any other method or technique to define a region of interest depicting a volume above the top shelf in the image.

10. Top Shelf Inventory Identification

Block S132 of the method S100 recites extracting a first set of features from a first region of the image above the top shelf; and Block S134 of the method S100 recites, based on the first set of features, detecting a first set of product units occupying the top shelf of the inventory structure. Generally, in Blocks S132 and S134, the computer system automatically identifies produce units (e.g., SKU values of these produce units) occupying the top shelf based on features detected in the region of interest in the image.

10.1 Barcode Detection

Figure 4A:
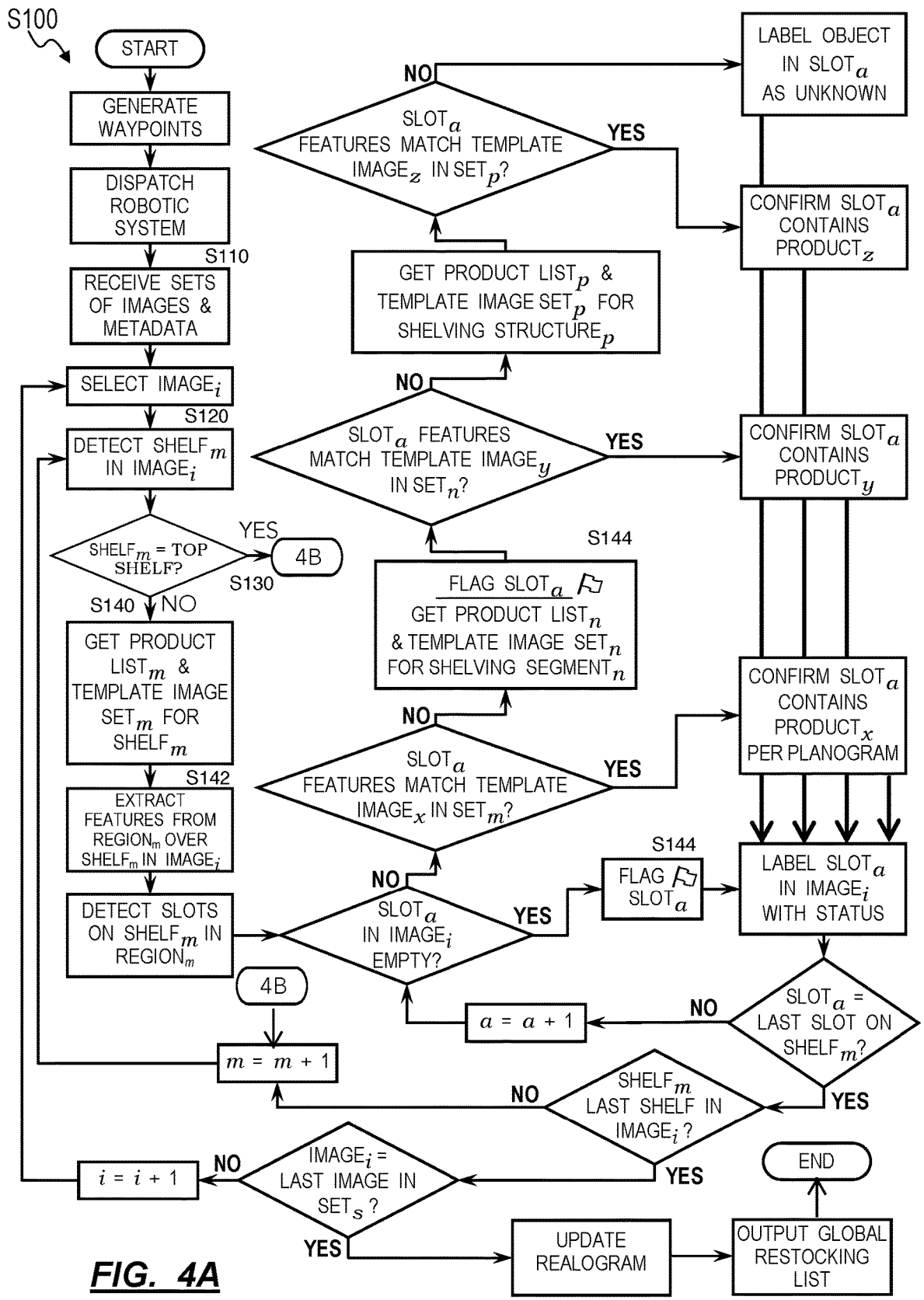
FIGS. 4A and 4B are a flowchart representation of one variation of the method.
Figure 4B:
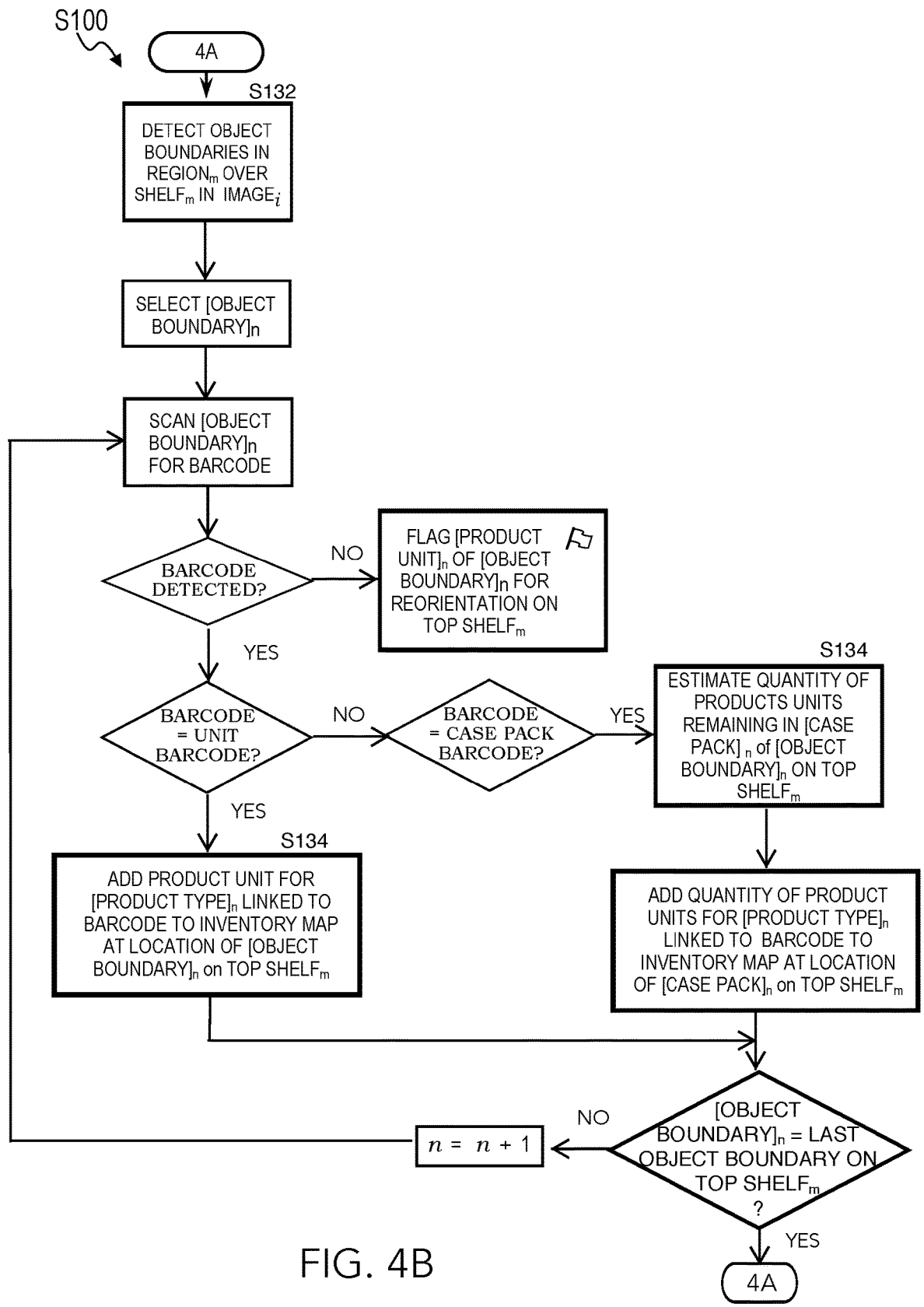

In one implementation shown in FIGS. 3 and 4B, the computer system implements object segmentation techniques—such as described in U.S. patent application Ser. No. 15/600,527—to distinguish individual product units depicted in the region of interest in the image and to calculate boundaries around each individual product unit occupying the top shelf. For a first product unit in this set, the computer system can then: scan a subregion of the image within the boundary of this product unit for a barcode; dewarp, flatten, "unwrinkle" this subregion of the image; and extract a lateral position of the boundary of this first product unit on the top shelf, such as from a leftmost corner of the top shelf detected in the image (e.g., by projecting a known dimension of the top shelf read from the planogram or extracted from the depth image onto the image). If the computer system thus detects a barcode within this subregion of the image depicting the first product unit, the computer system can then: extract a barcode value from this barcode; query a barcode database for a SKU or other product identifier of a product associated with this barcode; and record presence of a unit of this product on this top shelf accordingly.

For example, the computer system can update a virtual realogram of the inventory structure with a flag containing this product identifier located at a lateral position—on a virtual representation of the top shelf of the inventory structure—that corresponds to the lateral position of the first product unit detected in the image. In another example, the computer system can update a spreadsheet, table, or other textual representation of top-shelf inventory on this inventory structure to reflect presence and lateral position of a unit of this product on this top shelf. Alternatively, the computer system can annotate the image directly to reflect the product type of the first product unit.

Alternatively, if the computer system fails to detect a barcode within this subregion of the image, the computer system can: flag the first product unit depicted in this subregion of the image as unknown and improperly inventoried; generate a notification specifying the inventory structure, the top shelf, and the lateral position of the first product unit on the top shelf and including a prompt to reorient the first product unit with its barcode facing outwardly from the top shelf; and send the notification directly to a store associate or append the prompt to a global inventory management list for the store, thereby enabling the computer system to identify this product unit—via its barcode—in an image of the inventory structure captured by the robotic system during a subsequent scan cycle.

The computer system can repeat this process for each other individual product unit detected in the region of interest in the image.

10.2 Visual Feature Identification

In one variation, the computer system implements methods and techniques described in U.S. patent application Ser. No. 15/600,527 to identify a product unit in the region of interest in the image based on colors, characters (e.g., text, icons, symbols), or a geometry of the product unit detected in a subregion of the image bounding this product unit.

For example, the computer system can: query the planogram of the store (or the inventory structure more specifically) for product identifiers of a set of products assigned to this inventory structure; extract a set of visual features from the subregion of the image depicting a first product unit; compare these extracted features to stored template features representative of this set of products assigned to the inventory structure; match these extracted features to template features representative of a particular product in this set; and record presence of a unit of this particular product on this top shelf accordingly. For example, the computer system can annotate this subregion of the image directly with a product identifier of this particular product, update the realogram of the inventory structure to reflect presence of this unit of the particular product, and/or update the spreadsheet, table, or other textual representation of top-shelf inventory on this inventory structure to reflect this product identifier, such as described above.

10.3 Hybrid Identification

In a similar variation, because product units of the same product may be grouped together on the top shelf, the computer system can compare visual features of a first product unit on which a barcode is not detected in the region of interest in the image to visual features of a second, adjacent product—on which a barcode was successfully detected and decoded from the region of interest in the image—in order to identify the first product unit In one example, the computer system fails to detect a barcode in a first subregion of the image depicting a first product unit but successfully detects a barcode in a second subregion of the image—immediately adjacent the first subregion—depicting a second product unit. Accordingly, to identify the first product unit, the computer system implements methods and techniques described above to: extract a first set of visual features (e.g., colors, text, icons, symbols, or packaging geometry) from the first subregion of the image; extracts a second set of visual features from the second subregion of the image; compares the first and second sets of features; and identifies the first product unit as a unit of the same product as the second product unit if the first and second sets of features sufficiently match (e.g., exhibit similar colorways, similar text and typeface, and/or similar iconography). Otherwise, the computer system can flag the first product unit as unknown and transmit a prompt to a store associate to reorient the first product unit, such as described above.

Additionally or alternatively, if the computer system fails to identify the first product unit based on similarities to the second identified product unit, the computer system can implement similar methods and techniques to compare features extracted from the subregion of the image depicting the first product unit to features extracted from other subregions of the image depicting identified product units stocked on lower shelves of the inventory structure. In particular, because a product unit occupying the top shelf was likely first placed on the top shelf by a store associate in order to empty a case pack or box of products of the same type after restocking a lower shelf on this inventory structure, the product unit occupying the top shelf may be of the same product type as another product unit occupying a lower shelf on this inventory structure. Therefore, the computer system can implement methods and techniques similar to those described above to identify a first product unit on the top by comparing its visual characteristics to a second, identified product unit on a lower shelf depicted in this same image if the computer system fails to detect or decode a barcode on the first product unit.

In a similar example, the computer system can: identify the top shelf in the image of the inventory structure; define a region of interest adjacent the top shelf (e.g., above and extending along the length of the top shelf) in the image; and implement object detection techniques to detect a set of object boundaries—representing a set of product units—in this region of the image depicting top shelf inventory on this inventory structure. The computer system can then: implement barcode detection techniques to detect a first set of barcodes within a first subset of object boundaries, in this set of object boundaries, corresponding to a first subset of product units in this set of product units; extract the first set of barcodes, for the first subset of product units, from this image; and identify the first subset of product units occupying the top shelf based on the first set of barcodes. The computer system can also: detect absence of complete or readable barcodes within a second subset of object boundaries—in the set of object boundaries—corresponding to a second subset of product units in this set of product units in Block S160; extract a second set of color, textual, and/or geometric features from the second subset of object boundaries; and identify the second subset of product units occupying the top shelf based on the second set of color features. In this example, the computer system can retrieve product type models for product types predicted to be located on the top shelf of the inventory structure, such as a set of template images, a color model (e.g., a histogram of colors present on packaging of a product type), and/or a symbol model (e.g., character strings present on packaging of a product type) for each product type assigned to slots on the inventory structure, detected via barcodes in the image, or detected on the top shelf of the inventory structure during a previous scan cycle. The computer system can then: match a first cluster of color, textual, and/or geometric features extracted from a first object boundary in this second subset of object boundaries; compare this first cluster of features to product type models until the computer system identifies a match; label the first object boundary in the image (or a representation of the first object boundary in an inventory map, realogram, stock list, etc.) with a product type associated with a particular product type model matched to the first cluster of features; and repeat this process for each other object boundary in the second subset of object boundaries in which the computer system fails to detect a complete or readable barcode in the region of interest—adjacent the top shelf—in the image. In this example, the computer system can also generate a prompt to reorient the each product unit in this second subset of product units—occupying the top shelf of the this inventory structure—in order to locate barcodes on these product units facing outwardly from the inventory structure in Block S162, thereby enabling the computer system to detect and identify these product units directly from their barcodes in images captured during subsequent scan cycles.

However, the computer system can implement any other method or technique to identify a product unit occupying the top shelf depicted in the image in Block S134. The computer system can also repeat these methods and techniques to identify each other product unit occupying the top shelf and depicted in the image.

10.4 Variation: Open Case Pack

Generally, a store associate may place an open case pack—containing one or more product units of a product—on the top shelf after unloading a subset of product units from this case pack into a slot on a lower shelf of the inventory structure. Therefore, in one variation, rather than detect and identify loose product units on the top shelf of the inventory structure, the computer system can additionally or alternatively detect—in the image—a case pack on the top shelf, identify a product shipped in this case pack, and then predict presence of at least one product unit of this product in this case pack on this top shelf accordingly, as shown in FIGS. 3 and 4B.

In one example, the computer system implements methods and techniques described above to: detect a surface depicted in a image above the top shelf; isolate a subregion of the image bounding this surface; and scan this subregion of the product unit for a barcode (or other case pack identifier). Upon detecting the barcode, the computer system decodes the barcode to identify the barcode as corresponding to a case pack configured to store a shipping quantity of units of a particular product. Accordingly, the computer system can predict an actual quantity of units of this particular product currently present in the corrugated box, such as between one unit and one unit fewer than the shipping quantity. The computer system can then update the realogram of the inventory structure to reflect this actual quantity of units of the particular product present on the top shelf.

11. Stock Detection

Block S140 of the method S100 recites identifying a second shelf, in the set of shelves in the inventory structure, depicted in the image, the second shelf arranged below the top shelf in the inventory structure. Block S142 of the method S100 recites extracting a second set of features from a second region of the image above the second shelf. Block S144 of the method S100 recites, based on the second set of features, detecting an understock condition at a particular slot on the second shelf. Block S150 of the method S100 recites identifying a particular product type assigned to the particular slot. Generally, in Blocks S140, S142, S144, and S150, the computer system can implement methods and techniques described in U.S. patent application Ser. No. 15/600,527 to: segment the image into subregions depicting slots on shelves below the top shelf; scan each subregion for features representative of product units; identify product units occupying these slots based on features extracted from subregions of the image depicting corresponding slots; and aggregate these derived data into a stock condition of the inventory structure. For example, the computer system can aggregate SKU or UPC identifiers and quantities of products thus detected in the image into a realogram of this inventory structure.

In one implementation shown in FIGS. 3 and 4A, for a customer-facing shelf—below the top shelf—detected in the image of the inventory structure, the computer system can: isolate a region of the image depicting the face of this customer-facing shelf; scan laterally across this region of the image for shelf tags and/or barcodes; and mark the lateral position of each shelf tag or barcode detected in this region of the product unit as the bottom-left corner (or the bottom-center) of a slot on this shelf. For example, the computer system can define a set of slots along the lateral span of this customer-facing shelf detected in the image, wherein each slot in this set: defines a bottom-left corner proximal one shelf tag or barcode detected on the shelf; extends rightward up above a left edge of an adjacent slot proximal a next shelf tag or barcode detected on the shelf; and extends upward to the bottom of the adjacent shelf in this inventory structure. Then, for a first slot on the customer-facing shelf, the computer system can: decode a first shelf tag or barcode—depicted on the face of the shelf adjacent the bottom-left corner of the first slot—into a product identifier (e.g., a SKU value, a UPC value) of a first product assigned to the first slot; and implement optical character recognition techniques to read a target quantity of facings—for this product in this slot—from the shelf tag. The computer system can also retrieve a representation of the first product based on this product identifier—such as in the form of a set of template images, a color model (e.g., a histogram of colors present on packaging of the product), and/or a symbol model (e.g., text, icons, or symbols present on packaging of the product), etc. representative of the first product—from a product database. Additionally or alternatively, the computer system can: query the planogram for an identifier of a product assigned to this first slot and then retrieve a representation of this first product from the first product database; and/or query the planogram for a target quantity of facings of the first product assigned to this slot.

The computer system can then implement object detection techniques to detect and identify discrete objects in a region of the image depicting the first slot. For example, for each discrete object detected in the slot, the computer system can: extract a set of features within a boundary of the object; and compare these features to the representation of the first product assigned to this first slot to either identify the object as a unit of the first product assigned to this first slot or identify the object as incorrectly stocked in the first slot. The computer system can then calculate an actual quantity of product facings of the first product present in the first slot based on a quantity of discrete objects containing features matched to the representation of the first product.

The computer system can also calculate an actual quantity of misplaced product units present in the first slot based on a quantity of discrete objects containing features distinct from (i.e., not matched to) the representation of the first product. Furthermore, the computer system can implement methods and techniques described above and in U.S. patent application Ser. No. 15/600,527 to compare features of these misplaced product units to representations of other products assigned to nearby slots in the inventory structure in order to identify these misplaced product units.

The computer system can then update the realogram of the inventory structure to reflect: the actual quantity of product facings of the assigned product; and the quantity of misplaced product units occupying the slot (i.e., the "stock condition" of the slot). (The computer system can similarly update a cell in a spreadsheet corresponding to the first slot with this derived stock condition and/or annotate the region of the image depicting this first slot with this derived stock condition.)

The computer system can repeat this process for each other slot detected on this shelf and can update the realogram (or the spreadsheet, the image) to reflect the current stock condition of the shelf accordingly. The computer system can also repeat this process for each other customer-facing shelf detected on the inventory structure in order to update the realogram (or the spreadsheet, the image) to reflect the current stock condition of the inventory structure as a whole.

Therefore, in Blocks S140, S142, S144, and S150, the computer system can: extract product identifier and product facing information for a slot from a slot tag in a image and/or retrieve this information from a planogram of the inventory structure; and determine identities and quantities of product units present in a slot based on these data. The computer system can then record these identification and quantity data for slots on these shelves in a realogram, spreadsheet, or other data structure for the inventory structure.

11.1 Top Shelf V. Customer-Facing Shelf Product Unit Identification

Therefore, because product units stocked on the top shelf of an inventory structure may be oriented with their barcodes facing outwardly for rapid detection with a manual scanner or via an image captured by the robotic system rather than for ease of visual identification by customers, the computer system can default to identifying product units on the top shelf of an inventory structure based on barcodes detected on these product units in an image captured by the robotic system, as described above, which may require limited computation and image processing. However, because product units stocked on the top shelf of an inventory structure may be oriented with their packaging fronts with visual branding graphics facing outwardly for ease of visual identification by customers rather than scanning with a manual scanner or imagining by the robotic system, the computer system can default to identifying product units on customer-facing slots in an inventory structure based on color, textual, geometric, and/or other image-based features detected on these product units in an image captured by the robotic system, which may require more computation and image processing.

In particular, the computer system can: detect a set of object boundaries of a first set of product units in a first region of an image depicting the top shelf of an inventory structure; detect a first set of barcodes within the set of object boundaries in the first image; extract a first set of barcodes from the first image; and identify the first set of product units based on the first set of barcodes. For this same image, the computer system can also: detect a first slot boundary—of a first slot on a second, lower shelf of this inventory structure—in a second region of this image; extract a first set of color features, geometry features, and/or textual features from the first slot boundary in this image; retrieve a first set of representative features of a first product type assigned to the first slot by the planogram of the store; detect an out-of-stock condition at the first slot in response to deviation of the first set of color features, geometry features, and/or textual features from the first set of representative features of the first product type (e.g., absence of the first set of representative features from the first set of color features, geometry features, and/or textual features representative of the first slot); detect an understock condition at the first slot in response to alignment of the first set of color features, geometry features, and/or textual features with the first set of representative features of the first product type and if the nearest product unit in the first slot is set back from a front edge of the first slot; detect a full-stock condition at the first slot in response to alignment of the first set of color features, geometry features, and/or textual features with the first set of representative features of the first product type and if the nearest product unit in the first slot is set near the front edge of the first slot; and repeat this process for each other slot in the inventory structure.

Alternatively, the computer system can: scan object boundaries of all product units depicted in the image for barcodes; identify product units by their barcodes if readable in the image; and otherwise identify these product units based on color, geometric, and/or textual features extracted from these object boundaries and stored product type models of product types stocked in the store. However, the computer system can implement any other method or technique to detect and identify product units present on inventory shelves and occupying customer-facing slots on inventory structures in the customer section of the store.

(In the variation described below in which the robotic system captures images of inventory structures in a back-of-store section of the store, the computer system can implement similar methods and techniques to detect and identify loose product units and case packs present on these inventory structures based on barcodes and/or other features detected in these images captured by the robotic system.)

11.2 Understock Conditions

The computer system can then identify understock and out-of-stock conditions at slots in customer-facing shelves in the inventory structure, as shown in FIGS. 3 and 4A.

In one implementation, for a first slot on a first customer-facing shelf in the inventory structure, the computer system calculates a difference between the actual quantity of product facings of an assigned product occupying the first slot and the target quantity of facings of this product assigned to the first slot. If this difference exceeds a threshold quantity (e.g., one facing, 50% of total facings assigned to the first slot), the computer system can flag the first slot as understocked.

Upon identifying the first slot as understocked, the computer system can estimate a quantity of product units of the assigned product necessary to bring the first slot back into its target stock condition. For example, the computer system can: calculate a difference between the actual quantity of product facings of an assigned product occupying the first slot and the target quantity of facings of this product assigned to the first slot; retrieve (e.g., from the planogram or from the corresponding shelf tag) a row quantity of product units designated for stacking behind each facing in this first slot; multiply this difference by the stack quantity; and store this resulting value as an understock quantity for the first slot.

The computer system can then: read a slot address of the slot directly from the adjacent shelf tag or retrieve this slot address from the planogram; and append the product identifier for the product assigned to the first slot and this understock quantity to a global restocking list for the store. The computer system can additionally or alternatively: annotate the image directly with a flag—including the product identifier and the understock quantity—at the location of this first slot depicted in the image; and/or annotate the realogram of the inventory structure to reflect this understock quantity of the first slot.

However, the computer system can implement any other method or technique: to calculate a quantity of product units of a particular product needed to bring this slot into compliance with a target stock condition specified by the corresponding shelf tag and/or or by the planogram; and to record this quantity, a product identifier for this product, and an address or other identifier of this slot. The computer system can then repeat this process for each other slot detected on a customer-facing shelf in the image.

11.3 Improper Stock Conditions

The computer system can similarly: calculate a quantity of misplaced product units present in a slot; append a global restocking list for the store with a quantity and a product identifier of each misplaced product unit present in the slot; update the global restocking list and/or the realogram of the inventory structure to reflect the address of this slot and this quantity of misplaced product units to remove from this slot.

However, the computer system can implement any other method or technique: to calculate a quantity of product units of a particular product improperly stocked in a slot; and to record this quantity, a product identifier for this product, and an address or other identifier of this slot. The computer system can then repeat this process for each other slot—depicted in the image—containing a misplaced product unit.

12. Restocking Prompts

Block S152 recites, in response to the first set of product units comprising a product unit of the particular product type, serving a prompt to a store associate to load product units of the particular product type from the top shelf of the inventory structure into the particular slot on the second shelf. Generally, in Block S152, the computer system can generate real-time restocking prompts or update a global restocking list for the store (which may be disseminated to store associates at a later time) to restock an understocked slot in the inventory structure either with product units from top-shelf inventory on the inventory structure or from back-of-store inventory based on the inventory state of the top shelf thus derived from the image.

As described above, the method is described as executed by the computer system: to identify a set of loose product units occupying the top shelf of an inventory structure based on features detected in an image of the inventory structure in Block S134; and to generate a prompt to transfer a loose product unit of a particular product type from the top shelf into a particular slot on a second, lower shelf on the inventory structure allocated for this particular product type—in place of retrieving product units of this particular product type from a case pack stored in back-of-store inventory at the store—in response to detecting an understock or out-of-stock condition at this particular slot. (However, the computer system can additionally or alternatively: detect sealed or open case packs on a top shelf of an inventory structure; and generate a prompt to transfer product units of a particular product type from a particular case pack on the top shelf into a particular slot on a second, lower shelf on the inventory structure allocated for this particular product type in response to detecting an understock or out-of-stock condition at this particular slot.)

12.1 Restocking with Top Shelf Inventory by Default

In one implementation, for an understocked slot, the computer system: retrieves a product identifier for a product assigned to this slot; and queries the realogram of this inventory structure for a quantity of product units of this product in top-shelf inventory at this inventory structure. If this top-shelf inventory quantity of this product is non-zero, the computer system generates a prompt to restock the slot directly with a product unit in top-shelf inventory at the inventory structure.

For example, the computer system can populate this prompt with a segment of the image depicting each product unit of this product detected on the top shelf in the image, such as with these product units highlighted or annotated. The computer system can additionally or alternatively write other relevant data to this prompt, such as: an address of the slot; a SKU value, a product description, or other identifier of the product; the top-shelf inventory quantity of this product; and/or approximate lateral positions (e.g., in inches) of these product units on the top shelf. The computer system can then transmit this prompt directly to a mobile device assigned to or carried by a store associate. The computer system can additionally or alternatively write this prompt to a global restocking list for the store and then distribute this global restocking list to associates in the store at the start of a scheduled restocking period.

12.2 Understocked Quantity V. Top Shelf Quantity

In another implementation, for an understocked slot, the computer system: retrieves a product identifier for a product assigned to this slot; and queries the realogram of this inventory structure for a quantity of product units of this product in top-shelf inventory at this inventory structure. If a ratio between the top-shelf inventory quantity of this product to this understocked quantity of this product for the slot is greater than a threshold proportion (e.g., 0.3), the computer system can generate and distribute a prompt to restock the slot directly with product units in top-shelf inventory at the inventory structure, as described above.

For example, if the understocked quantity at a particular slot is five product units of a product and the computer system detects two product units of this product on the top shelf of the same inventory structure, the computer system can generate a prompt to restock the particular slot with the two product units of this product currently stored on the top shelf of this inventory structure. However, in this implementation, if this ratio between the top-shelf inventory quantity to this understocked quantity for this product is less than the threshold proportion, the computer system can instead generate a prompt to retrieve units of the product—such as the understocked quantity of product units of this product exactly or a case pack containing multiple units of the product—from back-of-store inventory and to restock the slot with these product units of the product.

12.3 Misplaced Product

In another implementation, if a first slot in the inventory structure contains a misplaced product unit and if this misplaced product unit is of a product assigned to a second, fully-stocked slot in the inventory structure, the computer system can generate a prompt to remove the misplaced product unit from the first slot and to place this product unit on the top shelf of the inventory structure. Similarly, if this misplaced product unit is of a product assigned to a second understocked slot in the inventory structure, the computer system can generate a prompt to remove the misplaced product unit from the first slot and to place this product unit in the second slot. However, if this misplaced product unit is of a product not assigned to another slot in the inventory structure, the computer system can generate a prompt to remove the misplaced product unit from the slot and to return this product unit to back-of-store inventory or to a top shelf of another inventory structure—containing a slot assigned to this product—in the store.

12.4 Image-Based Restocking Prompt

In one implementation shown in FIG. 3, the computer system: annotates the image of the inventory structure to highlight a loose product unit (or a case pack) located on the top shelf and the corresponding slot on the inventory structure on which to relocate this loose product unit (or product units from this case pack) when restocking slots in this inventory structure; and serves this image to a store associate in order to guide the store associate in restocking this inventory structure.

For example, the computer system can: identify a first product unit of a first product type on a top shelf of an inventory structure depicted in an image; identify a first understocked slot assigned to the first product type in the inventory structure depicted in this image; annotate the image to highlight a first location of the first product unit on the top shelf of the inventory structure; annotate the image to highlight a second location of the first slot on a second, lower shelf of the inventory structure; annotate the image with a prompt to transfer the first product unit at the first location on the top shelf to the first slot at the second location on the second shelf of the inventory structure; and then serve this annotated image to a computing device accessed by an associate of the store. The store associate may then review this annotated image and then navigate immediately to the first slot, retrieve the first product unit, and place the first product unit directly in the first slot.

In this implementation, if the computer system identifies the first slot as empty (i.e., "out-of-stock"), the computer system can also: retrieve an assigned quantity of product units of the first product type designated for the first slot (e.g., in the planogram of the store); scan the image for product units of this first product type occupying the top shelf of the inventory structure; highlight a target quantity of product units of the first product type—up to the assigned quantity—depicted on the top shelf in the image; and write a prompt to the image or pair the image with a prompt to relocate each highlighted product unit to the first slot on the inventory structure.

Similarly, in this implementation, if the computer system identifies the first slot as understocked, the computer system can: retrieve an assigned quantity of product units of the first product type designated for the first slot (e.g., in the planogram of the store); estimate a quantity of product units of the first product type remaining in the first slot; calculate a target quantity of product units based on a difference between the assigned quantity and the quantity of product units of the first type remaining in the first slot; scan the image for product units of this first product type occupying the top shelf of the inventory structure; highlight the target quantity of product units of the first product type depicted on the top shelf in the image; and write a prompt to the image or pair the image with a prompt to relocate each highlighted product unit to the first slot on the inventory structure.

In these implementations, if the quantity of product unit of the first product type detected on the top shelf exceeds the target quantity of product units of the first product type to relocate to the first slot, the computer system can also prioritize selection of product units—occupying the top shelf of the inventory structure—at greatest distance from the first slot for restocking of the first slot. In particular, the computer system can selectively highlight product units in top shelf inventory depicted in the image in order to guide a store associate toward restocking the customer-facing slots with product units on the top shelf furthest from their assigned customer-facing slots on the inventory structure and leaving excess product units on the top shelf nearest their correspond customer-facing slots, thereby limiting and correcting for drift of product units in top shelf inventory away from their corresponding customer-facing slots and maintaining orderliness of the top shelf.

In the foregoing example, the computer system can: estimate an understock quantity of the first product type at the first slot; identify a first subset of product units, of the first product type, occupying the top shelf of the inventory structure based on the first set of features; annotate the first image to highlight locations of a target quantity of product units, in the first subset of product units, on the top shelf of the inventory structure, the target quantity of product units approximating the understock quantity; annotate the first image to highlight a target location of the first slot on the second shelf of the inventory structure; and annotate the first image with a prompt to transfer the target quantity of product units on the top shelf of the inventory structure to the target location on the second shelf of the inventory structure. In this example, the computer system can also: characterize a set of distances from locations of product units, in the first subset of product units, to the target location based on the first image; and select the target quantity of product units, from the first subset of product units, characterized by greatest distances, in the set of distances, to the target location.

However, the computer system can select a subset of product units of a particular product type—in top shelf inventory—for relocation to a particular slot on an inventory structure based on any other feature or characteristic of these product units.

12.5 Restocking from Case Packs in Top Shelf Inventory

In one variation shown in FIGS. 3 and 4B, the computer system: detects sealed or open case packs on a top shelf of an inventory structure; and generates a prompt to transfer product units of a particular product type from a particular case pack on the top shelf into a particular slot on a second, lower shelf on the inventory structure allocated for this particular product type in response to detecting an understock or out-of-stock condition at this particular slot.

In one implementation, the computer system: detects a set of object boundaries in a first region of an image adjacent a top shelf of an inventory structure depicted in this image; detects a set of barcodes within this set of object boundaries in the image; extracts this set of barcodes from the image; and identifies a first case pack, located on the top shelf of the inventory structure and associated with the first product type, based on a first barcode detected within a first object boundary in the first region of the image. In this implementation, the computer system can also estimate a quantity of product units of the first product type currently stored in the first case pack, such as based on: a sealed product unit quantity associated with the first barcode; quantities of product units previously suggested for transfer from the first case pack to a slot on the inventory structure by the computer system; and/or quantities of product units previously confirmed as present in the first case pack by a store associate, such as when restocking the inventory structure during a previous restocking period.

In this implementation, the computer system can then generate a prompt to transfer product units of the first product type from the first case pack—stored on the top shelf of the inventory structure—into the first slot on the second, lower shelf of the inventory structure, such as in place of retrieving product units from case packs stored in back-of-store inventory at the store.

12.6 Restocking from Top Shelf Inventory on Other Inventory Structures

Generally, store associates may store loose product units, open case packs, and/or sealed case packs of a particular product type on a top shelf of an inventory structure that does not contain a customer-facing slot assigned to this particular product type. Thus, in one implementation, the computer system can: identify loose product units, open case packs, and/or sealed case packs of a particular product type on a top shelf of a first inventory structure in a first image captured by the robotic system during a scan cycle; identify a particular slot—assigned to this particular product type by the planogram—in a second inventory structure in a second image captured by the robotic system during this scan cycle; detect an understock condition at the particular slot; and generate a prompt to transfer product units of the particular product type from the top shelf of the first inventory structure to the particular slot on the second inventory structure, such as by annotating the first image to highlight these product units, annotating the second image to highlight the particular slot, and serving these images to a store associate's mobile device, as described above.

For example, the computer system can: access the second image of the second inventory structure in the store; detect a second set of shelves, in the second inventory structure, depicted in the second image; identify the top shelf, in the second inventory structure, depicted in the second image; extract a second set of features from a second region of the second image adjacent the second top shelf; identify a second set of product units occupying the second top shelf of the second inventory structure based on the second set of features; identify a second customer-facing shelf, in the second set of shelves in the second inventory structure, depicted in the second image; extract a second set of features from a second region of the second image adjacent this second customer-facing shelf; and detect an understock condition at a particular slot—assigned to the particular product type—in the second inventory structure based on the second set of features.

Then, if the second set of product units occupying the second top shelf of the second inventory structure excludes product units of the particular product type (or if the quantity of product units of the particular product type occupying the second top shelf of the second inventory structure is insufficient to fully stock the particular slot), the computer system can scan top shelf inventory—detected in images of other inventory structures throughout the store recently captured by the robotic system—for product units of the particular product type. Upon identifying a loose product unit, an open case pack, or a sealed case pack of the particular product type on the top shelf of the first inventory structure, the computer system can generate a prompt to transfer product unit of the particular product type from the top shelf of the first inventory structure into the particular slot at the second inventory structure.

12.7 Top Shelf Inventory not Available

However, in the foregoing implementation, if the computer system fails to detect product units of the particular product type in top shelf inventory on all inventory structures within the customer section of the store, the computer system can: scan images of back-of-store inventory structures recently captured by the robotic system for loose product units, open case packs, and/or sealed case packs of the particular product type; and/or query a back-of-store inventory system for presence and locations of loose product units, open case packs, and/or sealed case packs of the particular product type in back-of-store inventory at the store. Upon identifying loose product units, open case packs, and/or sealed case packs of the particular product type in back-of-store inventory at the store, the computer system can generate a prompt to restock the particular slot with product units from back-of-store inventory and serve this prompt to a store associate in real-time or add this prompt to a global restocking list for the store.

For example, upon detecting the understock condition at the particular slot in the second inventory structure in Block S144, the computer system can scan lists of loose product units, open case packs, and/or sealed case packs of the particular product type detected in top shelf inventory in inventory structures throughout the customer section of the store. Upon failing to detect an insufficient quantity of loose product units, open case packs, and/or sealed case packs of the particular product type in top shelf inventory in the customer section of the store, the computer system can generate a prompt to transfer product units of the particular product type—located in back-of-store inventory at the store—into the particular slot at the second inventory structure.

In this implementation, the computer system can also prioritize restocking prompts based on whether these prompts specify restocking with top shelf inventory or with back-of-store inventory. For example, the computer system can: serve a prompt specifying restocking with top shelf inventory to a store associate's mobile device in (near) real-time upon detecting an understock condition at an inventory structure and top shelf inventory of the corresponding product type at the same inventory structure; and add a prompt specifying restocking with back-of-store inventory to a global restocking list upon detecting an understock condition at an inventory structure and absence of top shelf inventory of the corresponding product type at the same inventory structure.

13. Inventory Map and Realogram

Therefore, as described above, the computer system can: dispatch the robotic system to autonomously navigate along a (first) set of consumer-facing inventory structures within a customer section of the store and to capture images of these inventory structures; distinguish top (or store-facing inventory) shelves from other customer-facing shelves on these inventory structures in these images; detect loose product units and (open) case packs on the top shelves of these inventory structure; detect product units occupying slots on these customer-facing shelves on the inventory structures; generate prompts to restock slots on these customer-facing shelves with loose product units and/or products in (open) case packs on the top shelves of these inventory structures; and serve these prompts to store associates, such as in real-time or in global restocking lists for the store.

As described above, the computer system can then compile locations of product units—on both top shelves and in customer-facing slots—into one realogram representing the current stock condition of the store, as shown in FIG. 1.

Alternatively, the computer system can generate: a realogram representing the current stock conditions of customer-facing slots within the customer-facing inventory structures within the store; and a separate inventory map representing current locations of loose product units and/or (open) case packs stored in inventory on top shelves on these customer-facing inventory structures within the store, as shown in FIG. 3.

In particular, in this variation, the computer system can initialize (or retrieve) an inventory map representing locations of top (or store-facing inventory) shelves across the set of customer-facing inventory structures within the customer section of the store. For each top shelf represented in the inventory map, the computer system can then: record a location and a product type (e.g., a product identifier) of each loose product unit—detected in images of the corresponding inventory structure captured during the last (or current) scan cycle—in the inventory map; and record a location, a product type, and an estimated quantity of product units contained in each case pack—detected in images of the corresponding inventory structure captured during the last (or current) scan cycle—in the inventory map.

Similarly, the computer system can initialize (or retrieve) a realogram representing locations of customer-facing slots across the set of customer-facing inventory structures within the customer section of the store. For each customer-facing slot represented in the realogram, the computer system can record a product type, an estimated quantity, and/or an orientation, etc. of a product unit(s) occupying the customer-facing slot—detected in images of the corresponding inventory structure captured during the last (or current) scan cycle—in the realogram.

The computer system can then present the updated realogram to a store associate, who may review the realogram to identify out-of-stock and understocked slots throughout the customer section of the store. The computer system can also present the updated inventory map to the store associate, who may review the inventory map to identify locations of product units in inventory and for guidance when restocking slots throughout the customer section of the store.

13.1 Back of Store Inventory Scanning

In this variation, the computer system can also: deploy the robotic system to scan inventory structures through the back-of-store section of the store; access images of these back-of-store inventory structures captured by the robotic system; implement methods and techniques described above to detect and track loose product units, open case packs, and sealed case packs in these images, and update the inventory map to reflect product types and locations of loose product units, open case packs, and sealed case packs in back-of-store inventory structures in the store thus derived from these images.

For example, the computer system can access an image of an inventory structure in a back-of-store inventory section in the store and identify a set of case packs occupying this inventory structure based on a set of features detected in this image. The computer system can also estimate a quantity of product units occupying the second inventory structure based on identities of these case packs, such as based on a barcode detected on a case pack and a stored case pack quantity linked to this barcode if the computer system detects a seal or if packing tape is intact on this case pack. The computer system can then: update the inventory map to reflect product types, quantities, and locations of product units detected in both top shelf inventory in the customer section of the store and on inventory structures in back-of-store inventory in the store; and generate prompts to restock slots in inventory structures in the customer section of the store with product units located throughout the store based locations of these product units recorded in the inventory map.

14. Aging Top Stock

In another implementation, the computer system can compare top stock inventory states derived from data captured by the robotic system over multiple scan cycles (e.g., over multiple days or weeks) to identify particular product units that have not moved (or not moved beyond a threshold distance, such as ten centimeters) in top-shelf inventory within a threshold duration of time (e.g., two weeks). For example, the computer system can implement object-tracking techniques to identify congruent product units in scan data captured by the robotic system over multiple scan cycles and to quantity movement of these product units over a corresponding during of time. Upon identifying a particular product unit that has remained in substantially the same position on a top shelf for this threshold duration of time, the computer system can prompt a store associate to either place this particular product unit in a customer-facing slot or remove the particular product unit from the inventory structure during a next restocking period.

15. Fixed Camera

In one variation, the store is outfitted with a set of fixed cameras, wherein each camera includes a color sensor and/or a depth sensor, faces an inventory structure in the store, configured to capture images of this inventory structure, and is configured to return these images to the computer system. In this variation, the computer system can implement methods and techniques similar to those described above to process images received from these fixed cameras, to derive top-shelf inventory and stock conditions of slots in these inventory structures, and to generate and distribute prompts to selectively restock these slots with product units from top-shelf inventory or back-of-store inventory.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method for tracking and maintaining inventory in a store comprising:
   accessing a first image of a first inventory structure in the store;
   detecting a first set of shelves, in the first inventory structure, depicted in the first image;

identifying a top shelf, in the first set of shelves in the first inventory structure, depicted in the first image;

extracting a first set of features from a first region of the first image adjacent the top shelf;

identifying a first set of product units occupying the top shelf of the first inventory structure based on the first set of features;

identifying a second shelf, in the first set of shelves in the first inventory structure, depicted in the first image, the second shelf arranged below the top shelf in the first inventory structure;

extracting a second set of features from a second region of the first image adjacent the second shelf;

based on the second set of features, detecting an understock condition at a first slot on the second shelf, the first slot assigned to a first product type;

estimating an understock quantity of the first product type at the first slot;

identifying a first subset of product units, of the first product type, occupying the top shelf of the first inventory structure based on the first set of features;

annotating the first image to highlight locations of a target quantity of product units, in the first subset of product units, on the top shelf of the first inventory structure, the target quantity of product units approximating the understock quantity;

annotating the first image to highlight a target location of the first slot on the second shelf of the first inventory structure; and based on the understock quantity of the first product type at the first slot:
  generating a first prompt to transfer the target quantity of product units of the first product type from the top shelf into the first slot on the second shelf at the first inventory structure; and
  annotating the first image with the first prompt.

2. The method of claim 1:
wherein extracting the first set of features from the first region of the first image comprises:
  detecting a set of object boundaries of the first set of product units in the first region of the first image;
  detecting a first set of barcodes within the set of object boundaries in the first image; and
  extracting the first set of barcodes from the first image;
wherein identifying the first set of product units comprises identifying the first set of product units based on the first set of barcodes;
wherein extracting the second set of features from the second region of the first image comprises:
  detecting a first slot boundary, of the first slot on the second shelf, in the second region of the first image; and
  extracting a second set of color features, geometry features, and textual features from the first slot boundary in the first image; and
wherein estimating the understock quantity at the first slot comprises:
  retrieving a set of representative features of the first product type; and
  detecting an out-of-stock condition at the first slot in response to deviation of the second set of color features, geometry features, and textual features from the set of representative features.

3. The method of claim 1:
wherein identifying the first set of product units comprises identifying the first set of product units, comprising loose product units, occupying the top shelf of the first inventory structure based on the first set of features; and
wherein generating the first prompt comprises generating the first prompt to transfer loose product units of the first product type from the top shelf into the first slot on the second shelf in place of product units from a case pack stored in back-of-store inventory at the store.

4. The method of claim 1:
wherein extracting the first set of features from the first region of the first image comprises:
  detecting a set of object boundaries of the first set of product units in the first region of the first image;
  detecting a first set of barcodes within the set of object boundaries in the first image, the first set of barcodes associated with case packs containing packaged product units; and
  extracting the first set of barcodes from the first image;
wherein identifying the first set of product units comprises:
  identifying a first case pack, located on the top shelf of the first inventory structure and associated with the first product type, based on a first barcode in the first set of barcodes; and
  estimating a quantity of product units of the first product type stored in the first case pack; and
wherein generating the first prompt comprises generating the first prompt to transfer the target quantity of product units of the first product type from the first case pack stored on the top shelf into the first slot on the second shelf in place of product units from case packs stored in back-of-store inventory at the store.

5. The method of claim 1, further comprising:
based on the first image, detecting an understock condition at a second slot in the first inventory structure, the second slot assigned to a second product type;
accessing a second image of a second inventory structure in the store;
detecting a second set of shelves, in the second inventory structure, depicted in the second image;
identifying a second top shelf, in the second set of shelves in the second inventory structure, depicted in the second image;
based on the second image, identifying a second set of product units occupying the second top shelf of the second inventory structure; and
in response to the second set of product units comprising a second product unit of the second product type, generating a second prompt to transfer the second product unit of the second product type from the second top shelf at the second inventory structure into the second slot at the first inventory structure.

6. The method of claim 5:
wherein identifying the first set of product units comprises identifying a product unit of the first product type occupying the top shelf of the first inventory structure based on the first set of features;
wherein identifying the second set of product units comprises identifying a second case pack, located on the second top shelf of the second inventory structure and associated with the second product type, based on the second image, the second case pack containing product units of the second product type;
wherein generating the first prompt comprises generating the first prompt to transfer the product unit of the first product type, located in a loose format on the top shelf of the first inventory structure, into the first slot on the second shelf at the first inventory structure; and wherein generating the second prompt comprises generating the second prompt to transfer product units of the second product type, packaged in the second case pack on the second top shelf of the second inventory structure, into the second slot at the first inventory structure.

7. The method of claim 1, further comprising:
based on the first image, detecting an understock condition at a second slot in the first inventory structure, the second slot assigned to a second product type; and
in response to the first set of product units excluding product units of the second product type, generating a second prompt to transfer product units of the second product type, located in back-of-store inventory at the store, into the second slot at the first inventory structure.

8. The method of claim 7:
wherein accessing the first image comprises accessing the first image of the first inventory structure captured at a first time; and
further comprising:
 at approximately the first time, serving the first prompt to a computing device accessed by an associate of the store; and
 at a second time succeeding the first time, serving the second prompt to the during a scheduled restocking period in the store.

9. The method of claim 1:
further comprising:
 at a computer system, deploying a mobile robotic system to execute a scan cycle in the store; and
 at the mobile robotic system, during the scan cycle:
  autonomously navigating along a set of inventory structures in the store; and
  capturing a sequence of photographic images of the set of inventory structures; and
wherein accessing the first image comprises:
 accessing a first series of photographic images, in the sequence of photographic images, of the first inventory structure captured by the mobile robotic system during the scan cycle; and
 compiling the first series of photographic images into the first image of the first inventory structure.

10. The method of claim 1:
wherein accessing the first image of the first inventory structure comprises accessing the first image of the first inventory structure within a customer section of the store; and
further comprising:
 accessing a second image of a second inventory structure in a back-of-store inventory section in the store;
 identifying a set of case packs occupying the second inventory structure based on a third set of features detected in the second image;
 estimating a second set of product units occupying the second inventory structure based on identities of the set of case packs; and
 generating an inventory map of product units within the customer section of the store and the back-of-store inventory section in the store based on the first set of product units and the second set of product units.

11. The method of claim 10:
further comprising:
 detecting stock conditions of a population of slots in a first set of inventory structures within the customer section of the store based on features detected in a set of images of the first set of inventory structures captured during a scan cycle; and
 generating a realogram representing stock conditions of the population of slots in the first set of inventory structures within the customer section of the store during the scan cycle;
wherein generating the inventory map comprises generating the inventory map representing locations of:
 product units of a population of product types in inventory on top shelves in the first set of inventory structures within the customer section of the store; and
 product units of the population of product types in inventory on a second set of inventory structures within the back-of-store inventory section in the store; and
generating a set of prompts to restock slots in the first set of inventory structures with product units located within the store according to the inventory map.

12. The method of claim 1:
wherein extracting the first set of features from the first region of the first image comprises:
 detecting a set of object boundaries of the first set of product units in the first region of the first image;
 detecting a first set of barcodes within a first subset of object boundaries, in the set of object boundaries, corresponding to a first subset of product units in the first set of product units;
 extracting the first set of barcodes, for the first subset of product units, from the first image;
 detecting absence of readable barcodes within a second subset of object boundaries, in the set of object boundaries, corresponding to a second subset of product units in the first set of product units; and
 extracting a second set of color features from the second subset of object boundaries;
wherein identifying the first set of product units occupying the top shelf of the first inventory structure comprises:
 identifying the first subset of product units based on the first set of barcodes; and
 identifying the second subset of product units based on the second set of color features; and
further comprising generating a second prompt to reorient the second subset of product units, on the top shelf of the first inventory structure, to locate barcodes on the second subset of product units facing outwardly from the first inventory structure.

13. A method for tracking and maintaining inventory in a store comprising:
 accessing a first image of a first inventory structure in the store;
 detecting a first set of shelves, in the first inventory structure, depicted in the first image;
 identifying an inventory shelf, in the first set of shelves in the first inventory structure, depicted in the first image;
 detecting a set of object boundaries in a first region of the first image adjacent the inventory shelf;
 detecting a first set of barcodes within the set of object boundaries in the first image, the first set of barcodes associated with case packs containing packaged product units;
 extracting the first set of barcodes from the first image;
 identifying a first case pack, located on the inventory shelf of the first inventory structure and associated with a first product type, based on a first barcode in the first set of barcodes;

estimating a quantity of product units of the first product type stored in the first case pack occupying the inventory shelf of the first inventory structure;

identifying a customer-facing shelf, in the first set of shelves in the first inventory structure, depicted in the first image;

extracting a first set of features from a second region of the first image adjacent the customer-facing shelf;

based on the first set of features, detecting an understock condition at a first slot on the customer-facing shelf;

identifying the first product type as assigned to the first slot; and based on the understock condition of the first product type at the first slot, generating a first prompt to transfer product units of the first product type from the first case pack stored on the inventory shelf into the first slot on the customer-facing shelf at the first inventory structure in place of product units from case packs stored in back-of-store inventory at the store.

14. The method of claim 13:

further comprising:

estimating an understock quantity of the first product type at the first slot on the customer-facing shelf;

annotating the first image to highlight locations of a target quantity of product units, in the quantity of product units, on the inventory shelf of the first inventory structure, the target quantity of product units approximating the understock quantity; and annotating the first image to highlight a target location of the first slot on the customer-facing shelf of the first inventory structure; and wherein generating the first prompt comprises annotating the first image with the first prompt to transfer the target quantity of product units from the first case pack stored on the inventory shelf of the first inventory structure to the target location on the customer-facing shelf of the first inventory structure.

15. The method of claim 14, further comprising:

based on the first image, characterizing a set of distances from locations of product units, in the quantity of product units, to the target location; and selecting the target quantity of product units, from the quantity of product units, characterized by greatest distances, in the set of distances, to the target location.

16. The method of claim 13:

wherein identifying the inventory shelf depicted in the first image comprises identifying, in the first image, the inventory shelf comprising a top shelf, in the first set of shelves in the first inventory structure, designated for storage of excess loose product units by store associates; and wherein identifying the customer-facing shelf in the first image comprises identifying the customer-facing shelf, in the first set of shelves in the first inventory structure, located below the top shelf.

17. A method for tracking and maintaining inventory in a store comprising:

accessing a first image of a first inventory structure within a customer section of the store;

identifying a top shelf, in the first inventory structure, depicted in the first image;

identifying a first set of product units occupying the top shelf of the first inventory structure based on features detected in the first image;

identifying a second shelf, in the first set of shelves in the first inventory structure, depicted in the first image, the second shelf arranged below the top shelf in the first inventory structure;

based on features detected in the first image, detecting an understock condition at a first slot on the second shelf, the first slot assigned to a first product type;

in response to the first set of product units comprising a product unit of the first product type, generating a first prompt to transfer the product unit of the first product type from the top shelf into the first slot on the second shelf at the first inventory structure;

accessing a second image of a second inventory structure in a back-of-store inventory section in the store;

identifying a set of case packs occupying the second inventory structure based on a second set of features detected in the second image;

estimating a second set of product units occupying the second inventory structure based on identities of the set of case packs; and generating an inventory map of product units within the customer section of the store and the back-of-store inventory section in the store based on the first set of product units and the second set of product units.

18. A method for tracking and maintaining inventory in a store comprising:

accessing a first image of a first inventory structure in the store;

detecting a first set of shelves, in the first inventory structure, depicted in the first image;

identifying a top shelf, in the first set of shelves in the first inventory structure, depicted in the first image;

detecting a set of object boundaries in a first region of the first image adjacent the top shelf;

detecting a first set of barcodes within the set of object boundaries in the first image, the first set of barcodes associated with case packs containing packaged product units;

extracting the first set of barcodes from the first image;

identifying a first case pack, located on the top shelf of the first inventory structure and associated with a first product type, based on a first barcode in the first set of barcodes;

estimating a quantity of product units of the first product type stored in the first case pack;

identifying a second shelf, in the first set of shelves in the first inventory structure, depicted in the first image, the second shelf arranged below the top shelf in the first inventory structure;

extracting a first set of features from a second region of the first image adjacent the second shelf;

based on the first set of features, detecting an understock condition at a first slot on the second shelf, the first slot assigned to the first product type; and based on the understock condition of the first product type at the first slot, generating a first prompt to transfer the product units of the first product type from the first case pack stored on the top shelf into the first slot on the second shelf at the first inventory structure in place of product units from case packs stored in back-of-store inventory at the store.

19. A method for tracking and maintaining inventory in a store comprising:

accessing a first image of a first inventory structure within a customer section of the store;

detecting a first set of shelves, in the first inventory structure, depicted in the first image;

identifying a top shelf, in the first set of shelves in the first inventory structure, depicted in the first image;
extracting a first set of features from a first region of the first image adjacent the top shelf;
identifying a first set of product units occupying the top shelf of the first inventory structure based on the first set of features;
identifying a second shelf, in the first set of shelves in the first inventory structure, depicted in the first image, the second shelf arranged below the top shelf in the first inventory structure;
extracting a second set of features from a second region of the first image adjacent the second shelf;
based on the second set of features, detecting an understock condition at a first slot on the second shelf, the first slot assigned to a first product type;
in response to the first set of product units comprising a product unit of the first product type, generating a first prompt to transfer the product unit of the first product type from the top shelf into the first slot on the second shelf at the first inventory structure;
accessing a second image of a second inventory structure in a back-of-store inventory section in the store;
identifying a set of case packs occupying the second inventory structure based on a second set of features detected in the second image;
estimating a second set of product units occupying the second inventory structure based on identities of the set of case packs; and
generating an inventory map of product units within the customer section of the store and the back-of-store inventory section in the store based on the first set of product units and the second set of product units.

20. A method for tracking and maintaining inventory in a store comprising:
accessing a first image of a first inventory structure in the store;
detecting a first set of shelves, in the first inventory structure, depicted in the first image;
identifying a top shelf, in the first set of shelves in the first inventory structure, depicted in the first image;
detecting a set of object boundaries of a first set of product units in a first region of the first image adjacent the top shelf;
detecting a first set of barcodes within a first subset of object boundaries, in the set of object boundaries, corresponding to a first subset of product units in the first set of product units;
extracting the first set of barcodes, for the first subset of product units, from the first image;
detecting absence of readable barcodes within a second subset of object boundaries, in the set of object boundaries, corresponding to a second subset of product units in the first set of product units;
extracting a second set of color features from the second subset of object boundaries;
identifying the first subset of product units occupying the top shelf as a first product type based on the first set of barcodes;
identifying the second subset of product units occupying the top shelf as the first product type based on the second set of color features;
identifying a second shelf, in the first set of shelves in the first inventory structure, depicted in the first image, the second shelf arranged below the top shelf in the first inventory structure;
extracting a first set of features from a second region of the first image adjacent the second shelf;
based on the first set of features, detecting an understock condition at a first slot on the second shelf, the first slot assigned to the first product type;
based on the understock condition of the first product type at the first slot:
  generating a first prompt to transfer the product units of the first product type from the top shelf into the first slot on the second shelf at the first inventory structure; and
  generating a second prompt to reorient the second subset of product units, on the top shelf of the first inventory structure, to locate barcodes on the second subset of product units facing outwardly from the first inventory structure.

\* \* \* \* \*